United States Patent [19]

Coran et al.

[11] Patent Number: 5,070,146

[45] Date of Patent: * Dec. 3, 1991

[54] RUBBER COMPOSITIONS CONTAINING POLYMERIC ACTIVATORS

[75] Inventors: Aubert Y. Coran, Akron, Ohio; Leonard H. Davis, Chicago, Ill.

[73] Assignee: Monsanto Company, St. Louis, Mo.

[*] Notice: The portion of the term of this patent subsequent to Jul. 30, 2008 has been disclaimed.

[21] Appl. No.: 381,227

[22] Filed: Jul. 18, 1989

Related U.S. Application Data

[62] Division of Ser. No. 205,968, Jun. 13, 1988.

[51] Int. Cl.$^5$ ............................ C08L 7/00; C08L 9/00
[52] U.S. Cl. ................................... 525/192; 525/203; 525/237
[58] Field of Search .............................. 525/192, 203

[56] References Cited

U.S. PATENT DOCUMENTS

| | | | |
|---|---|---|---|
| 2,893,971 | 7/1959 | Kennedy et al. | 260/45.5 |
| 2,984,644 | 5/1961 | Wheat | 260/45.5 |
| 3,114,409 | 12/1963 | Iknayan et al. | 525/203 |

FOREIGN PATENT DOCUMENTS 818285  5/1959  United Kingdom .

OTHER PUBLICATIONS

V. G. Epshtein et al.—"Low-Temperature Copolymers . . . ", Soviet Rubber Technol. 18 (9) 13 (1960).
W. W. Rinne et al.—"Effect of 2-Vinylpyridine . . . ", I&E Chem. 40 (8) 1437 (1948).

*Primary Examiner*—Allan M. Lieberman
*Assistant Examiner*—R. Dean
*Attorney, Agent, or Firm*—Gordon B. Seward

[57] ABSTRACT

Butadiene polymer rubber compositions containing a polymeric activator have particularly beneficial characteristics. The activator is an interpolymer of a vinylpyridine monomer and a diene hydrocarbon monomer which interpolymer contains from 20% to 65% by weight of vinylpyridine units. Composite articles made from these rubber compositions together with contiguous portions of a dissimilar rubber compound show greater strength and adhesion as a result of the presence of a activator in the butadiene polymer rubber composition.

10 Claims, 5 Drawing Sheets

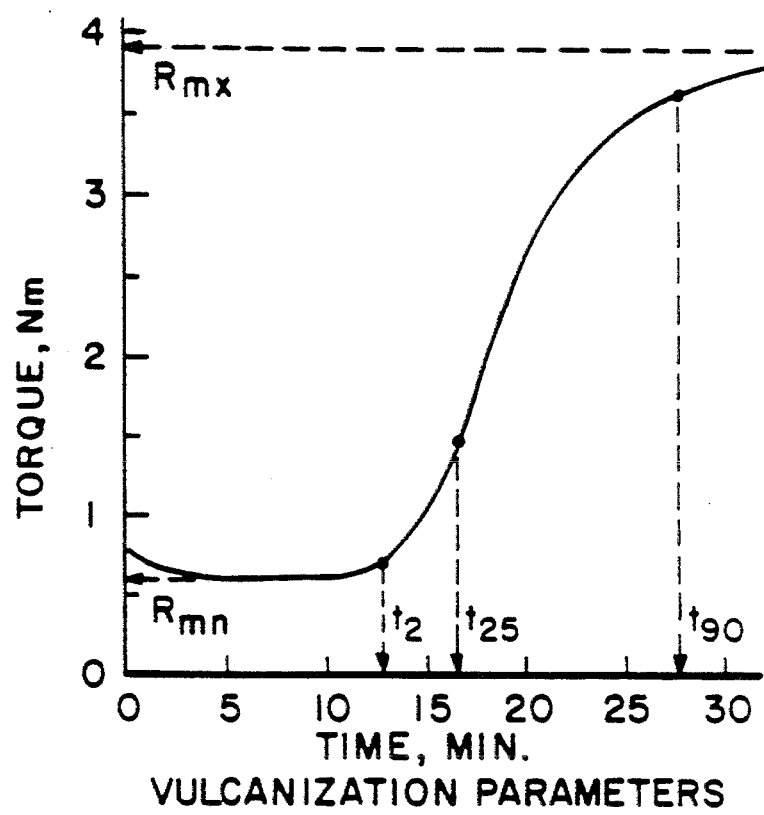
VULCANIZATION PARAMETERS
*FIG. I.*
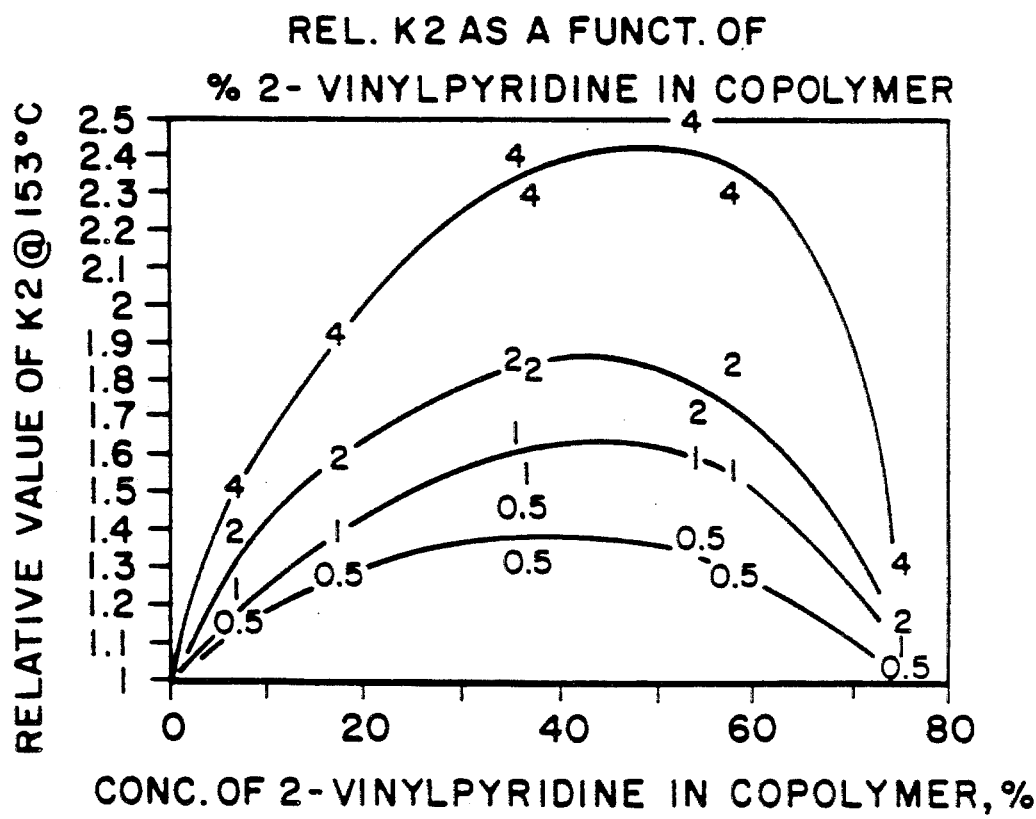
*FIG. 2.*

RUBBER COMPOSITIONS CONTAINING POLYMERIC ACTIVATORS

This is a division of application Ser. No. 07/205,968, filed June 13, 1988.

This invention relates to vulcanazable rubber compounds which contain polymeric activators of vulcanization. The polymeric activators are interpolymers from a vinylpyridine monomer and conjugated diene monomers.

BACKGROUND OF THE INVENTION

Interpolymers from vinylpyridine monomers and conjugated diene monomers are known. These interpolymers have been used as oil-resistant rubbers in a variety of applications and, in latex form, as adhesives between textile cords and rubber.

The particular behavior of vinylpyridine interpolymers in the vulcanization process has also been noted, when these interpolymers were combined with other vulcanizable rubber. An increase in modulus, tensile strength and tear strength was noted in rubber vulcanizates containing arge (30–70%) proportions of vinylpyridine interpolymers (with low levels of vinylpyridine, e.g. 5–15%) blended with such rubbers as natural rubber, styrene-butadiene rubber and butadiene-acrylonitrile rubber.

Terpolymers from butadiene, styrene and a small amount of vinylpyridine have also been shown to have a faster cure rate and a resultant higher modulus than control copolymers from butadiene and styrene alone.

BRIEF SUMMARY OF THE INVENTION

It has now been found that improved rubber compositions can be obtained by incorporating in a butadiene polymer rubber compound, in addition to sulfur and a vulcanization accelerator, from 0.1 to 10 parts by weight, per 100 parts by weight of the butadiene polymer rubber of a polymeric activator which is an interpolymer of a vinylpyridine monomer and a diene hydrocarbon monomer, which interpolymer contains from 20% to 65% by weight of vinylpyridine units.

Additionally, it has been found that improved composite articles can be obtained which include contiguous portions of (A) an isoprene rubber compound comprising sulfur and a vulcanization accelerator and (B) a butadiene polymer rubber compound comprising sulfur, a vulcanization accelerator and from 0.1 to 10 parts by weight, per 100 parts by weight of the butadiene polymer rubber, of a polymeric activator which is an interpolymer of a vinylpyridine monomer and a diene hydrocarbon monomer.

The improved rubber compositions of the invention possess increased rates of cure with very little increase in scorch rates, and very little increase in the modulus of the cured compositions. Increased cure rates are very desirable, since faster rates of production of rubber articles can thus be obtained. Molded rubber articles can be removed from the mold at an earlier time without the danger of undercure. While it is always possible to increase the cure rate of a rubber compound (up to a point) by using combinations of accelerators and/or higher levels of accelerators, these changes are often accompanied by unacceptable loss of scorch delay or an unacceptable increase in the modulus of the vulcanized article. By using the compositions of the invention, one can obtain faster curing rubber compounds with a minimal decrease in scorch delay and a minimal increase in the modulus of the finished article.

Additionally, the composite articles of the invention offer a unique solution to a common problem encountered in the production of rubber articles which have contiguous portions of dissimilar rubbers. An example of such articles is a pneumatic tire, in which the various components or sectors of the tire are compounded for widely different performance. Tread portions, for example, are compounded for a balance of wear-resistance, skid-resistance and (in some cases) a resistance to chipping and chunking. Other, structural, elements of a tire may be compounded so as to optimize such properties as low hysteresis and maximum adhesion to wire or textile reinforcing elements. Thus, for example, it is often found that one portion of a composite rubber article is made from a relatively slow-curing SBR compound, and another, contiguous, portion is made from a relatively faster-curing natural rubber compound. If the article is subjected to sufficient time and temperature to cure one portion optimally, it is clear that the other portion will be either overcured or undercured.

The use of additional accelerator in the slower-curing portion has not solved this problem, since, as has been found, the faster-curing compound appears to "attract" curative across the interface between the two portions, and the resultant emigration of curatives from the slower-curing portion results in an even greater disparity of cure rates across the interface, and a poor bond between the two portions is realized, creating eventual separation or de-lamination and a failure of the article.

The composite articles of the invention avoid the above problems by the nature of the activator. Since it is polymeric, it has very little tendency to emigrate from the butadiene polymer rubber compound, and its beneficial effects can be realized, even at the interface between the butadiene polymer rubber portion and the isoprene rubber portion.

BRIEF DESCRIPTION OF THE DRAWINGS

FIG. 1 is a typical rheograph showing the parameters of vulcanization.

FIGS. 2 through 9 are curves showing the relationship of various vulcanization parameters to the concentration of vinylpyridine in the polymeric activators, plotted at different levels of activator in the rubber compounds. Thus, the contours relate to varying concentration of activator in the rubber mixes.

DETAILED DESCRIPTION OF THE INVENTION

Figure 3:
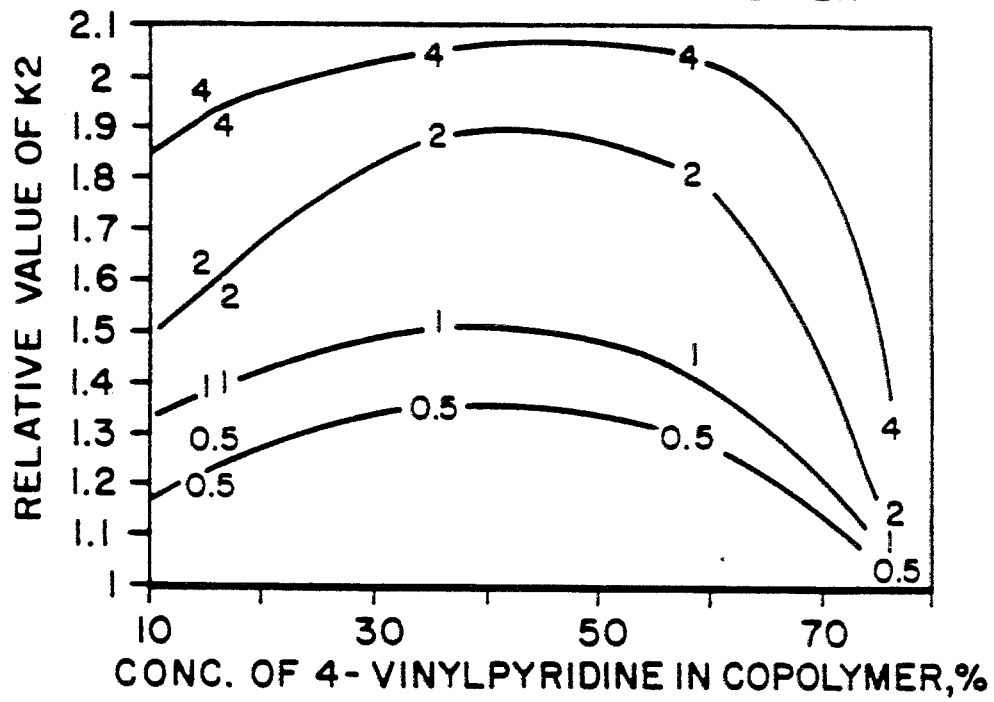

Butadiene polymer rubbers useful in the compositions of the invention include butadiene homopolymers and copolymers from 1,3-butadiene and a vinyl aromatic co-monomer, such as styrene or alphamethyl styrene. The butadiene-styrene copolymers preferably contain a minor amount of styrene and a major amount of butadiene; such preferred copolymers are known as SBR copolymers. Butadiene homopolymers include those having predominantly cis-1,4 microstructure, and homopolymers which have substantial contents of trans-1,4 or 1,2 microstructure. The butadiene polymers used in the invention are preferably "elastomeric" materials; that is they conform, when vulcanized, to the definition of an elastomeric or rubbery material found in ASTM D 1566.

The butadiene polymers, in the compositions of the invention, contain sulfur and a vulcanization accelerator. Sulfur is present in the butadiene polymers as a source of crosslinks; typically, lower amounts of sulfur produce vulcanizates having lower crosslink densities, and a resultant low "state of cure." Very high amounts of sulfur, conversely, produce vulcanizates having high crosslink densities, and a resultant high "state of cure." Extremely high sulfur levels result in "hard rubber" or ebonite. Preferred sulfur levels in the butadiene polymers are from 0.2 to 4 parts by weight per 100 parts by weight of polymer.

Vulcanization accelerators useful in the compositions of the invention include a large number of well-known materials. Typical accelerators are listed in the "Rubber World Bluebook." The choice of which accelerator (or accelerators) to use can depend on a number of factors, and is not critical to the invention. Among usable accelerators are thiazoles, such as 2-mercaptobenzothiazole and benzothiazyl disulfide; benzothiazyl sulfenamides, such as N-cyclohexyl-2-benzothiazylsulfenamide, N,N-dicyclohexylbenzothiazylsulfenamide, N,N-diethylbenzothiazylsulfenamide, N,N-diisopropylbenzothiazylsulfenamide, N-oxydiethylenebenzothiazylsulfenamide, N-isopropylbenzothiazylsulfenamide and N-t-butylbenzothiazylsulfenamide; guanidines, such as di-ortho-tolylguanidine and diphenyl guanidine; thioureas, such as ethylenethiourea, tetramethylthiourea, N,N'-diethylthiourea and N,N'-dibutylthiourea; thiurams, such as N,N'-dimethyl-N,N'-diphenylthiuram disulfide, dipentamethylenethiuram hexasulfide, tetrabutylthiuram monosulfide, tetraethylthiuram disulfide, tetrabutylthiuram disulfide and tetramethylthuiram disulfide; xanthates, such as zinc dibutyl xanthate and dibutyl xanthogen disulfide; and dithiocarbamates, including various salts of di-lower alkyl dithiocarbamic acid, such as the zinc, lead, ferric, copper, selenium, sodium, tellurium, potassium, bismuth, dimethylammonium and cyclohexylammonium salts.

The amount of accelerator used will vary widely, depending on the type used and the result desired, as is well known in the art. Preferred levels of accelerator are from 0.2 to 5 parts by weight per 100 parts butadiene polymer.

The activators of the invention, which are essential components of the rubber composition, are interpolymers of vinylpyridine monomer and diene hydrocarbon co-monomer in which the interpolymer contains from 20% to 65%, preferable 30% to 55%, and even more preferable 35% to 50%, by weight of vinylpyridine units. The interpolymer activators can be produced by copolymerization of vinylpyridine monomer and diene hydrocarbon monomer in known polymerization reactions. Preferred vinylpyridine monomers include 2-vinylpyridine, 4-vinylpyridine and 2-methyl-5-vinylpyridine. Preferred diene hydrocarbon monomers include 1,3-butadiene, isoprene and piperylene, with 1,3-butadiene being especially preferred. Other comonomers can be included, such as styrene, for example, but copolymers from 1,3-butadiene and one of the listed preferred vinylpyridine monomers are more preferred.

The rubber compositions of the invention can also contain typical compounding ingredients, such as antidegradants, fillers, extender oils, zinc oxide, stearic acid and other well-known materials normally used in butadiene polymer rubber compounds.

A more complete understanding of the invention can be obtained by reference to the following examples, in which all parts are by weight and all temperatures are in degrees Celsius, unless otherwise specified.

EXAMPLE I

Copolymers of 1,3-butadiene with 2-vinylpyridine and with 4-vinylpyridine are prepared by emulsion polymerization according to a procedure similar to that given by W. B. Reynolds, J. E. Prichard, M. H. Opheim and G. Kraus, *Rubber Chemistry and Technology*, 30, 338 (1948). The comonomers are charged into the reaction mixtures, with delayed additions, to give a series of butadiene copolymers containing various proportions of units derived from 2-vinylpyridine or from 4-vinylpyridine. The vinylpyridine content of each of the copolymers are determined by elemental analysis. The copolymers are listed in Table I.

TABLE I

| VINYLPYRIDINE-BUTADIENE COPOLYMERS | | | |
|---|---|---|---|
| Polymer Identification | Co-monomer | vinyl-pyridine in charge % | vinyl-pyridine in polymer % |
| 2VP1 | 2-vinylpyridine | 20 | 6.5 |
| 2VP1A | 2-vinylpyridine | 20 | 17.1 |
| 2VP2 | 2-vinylpyridine | 40 | 35.2 |
| 2VP2A | 2-vinylpyridine | 40 | 36.4 |
| 2VP3 | 2-vinylpyridine | 60 | 57.3 |
| 2VP3A | 2-vinylpyridine | 60 | 53.8 |
| 2VP4A | 2-vinylpyridine | 80 | 74.6 |
| 4VP1 | 4-vinylpyridine | 20 | 14.9 |
| 4VP1A | 4-vinylpyridine | 20 | 16.6 |
| 4VP2 | 4-vinylpyridine | 40 | 35.5 |
| 4VP3 | 4-vinylpyridine | 60 | 58.6 |
| 4VP4 | 4-vinylpyridine | 80 | 76 |

From Table I it may be seen that the various butadiene-vinylpyridine copolymers range from 6.5% to 76% vinylpyridine content.

EXAMPLE II

Each of the vinylpyridine copolymers are blended into a carbon black-filled SBR masterbatch at concentrations of 0.5, 1.0, 2.0, and 4.0 phr. (The abbreviation "phr" means parts per hundred of rubber, by weight.) Unfilled SBR 1502 (a copolymer of about 23% styrene and 73% butadiene) was added to each composition such that the amount of added SBR plus the added vinylpyridine copolymer was always 4.0 phr. Control compositions, each containing no vinylpyridine copolymer, but containing 4.0 phr of the unfilled SBR 1502, were also prepared and evaluated. The recipe for the masterbatch, in parts by weight, was as follows: SBR 1502, 100; N-330 carbon black (HAF), 50; Circosol 4240 naphthenic oil, 5; zinc oxide, 5; stearic acid, 2. The masterbatch was prepared by standard procedures in a Banbury mixer. The curatives, vinylpyridine copolymer activators, and 2.0 phr of N-1,3-dimethylbutyl-N'-phenyl-p-phenylenediamine antideradant (SANTOFLEX ®-13) were added on a roll mill. Tests of the compositions were in accordance with the appropriate ASTM procedures for rubber. In each compound the curing system comprises 2.0 phr sulfur and 1.2 phr N-t-butyl-benzothiazylsulfenamide (SANTOCURE ® NS) accelerator. Vulcanization characteristics are determined by using the Mooney viscometer at 135° and the Monsanto Oscillating Disc Rheometer (ODR) at 153°. Mooney scorch, a measure of scorch resistance (resistance to premature vulcanization) is taken as the time required for a 5 point rise from the minimum Mooney viscosity. Other parameters which characterize vulcanization are taken from the ODR cure curves ("rheographs"), which are obtained for vulcanization at 153°

C., according to FIG. 1. The parameters Rmn and Rmx are the minimum rheometer torque (before the onset of vulcanization) and the maximum rheometer torque (due to vulcanization), respectively. The parameter t2 is the time required for an increase (over Rmn) in rheometer torque of 2.2 dNm (2.0 in-lb); t25 is time required for the occurrence of 25% of the increase in torque due to vulcanization (time at R/(Rmx−Rmn)=0.25); t90 is the time required for the occurrence of 90% of the increase in torque due to vulcanization (time at R/(Rmx−Rmn)=0.90); and the vulcanization rate constant, K2, is a first-order rate constant estimated from the shape of the rheograph cure curve after the occurrence of an inflection point (the point of the curve corresponding to the maximum slope of torque increase per unit of time).

Figure 4:
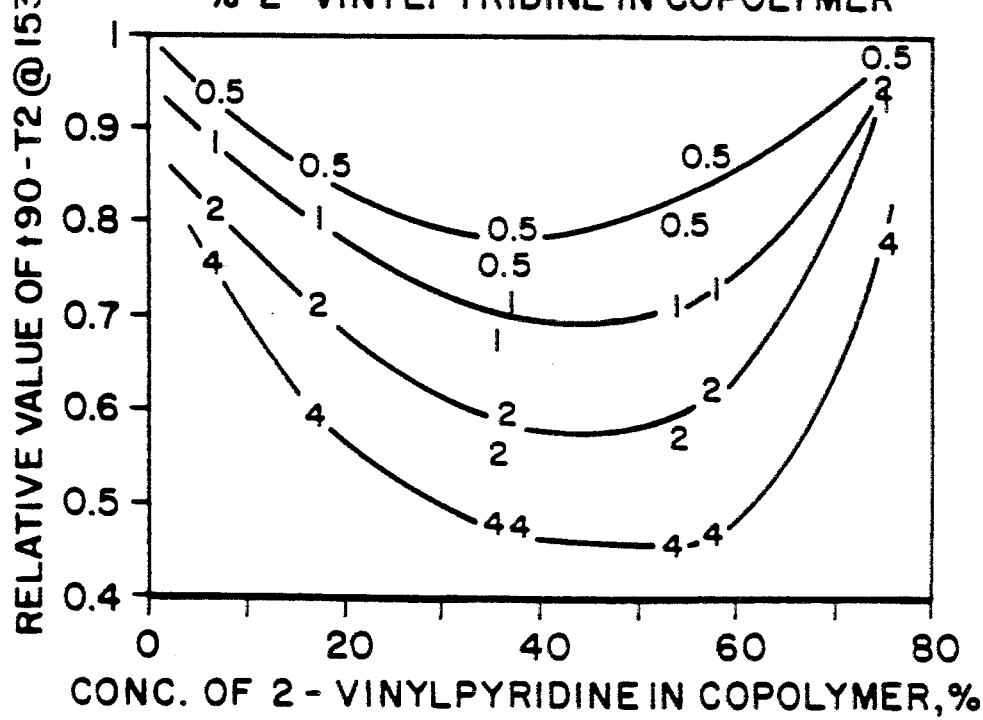
Figure 5:
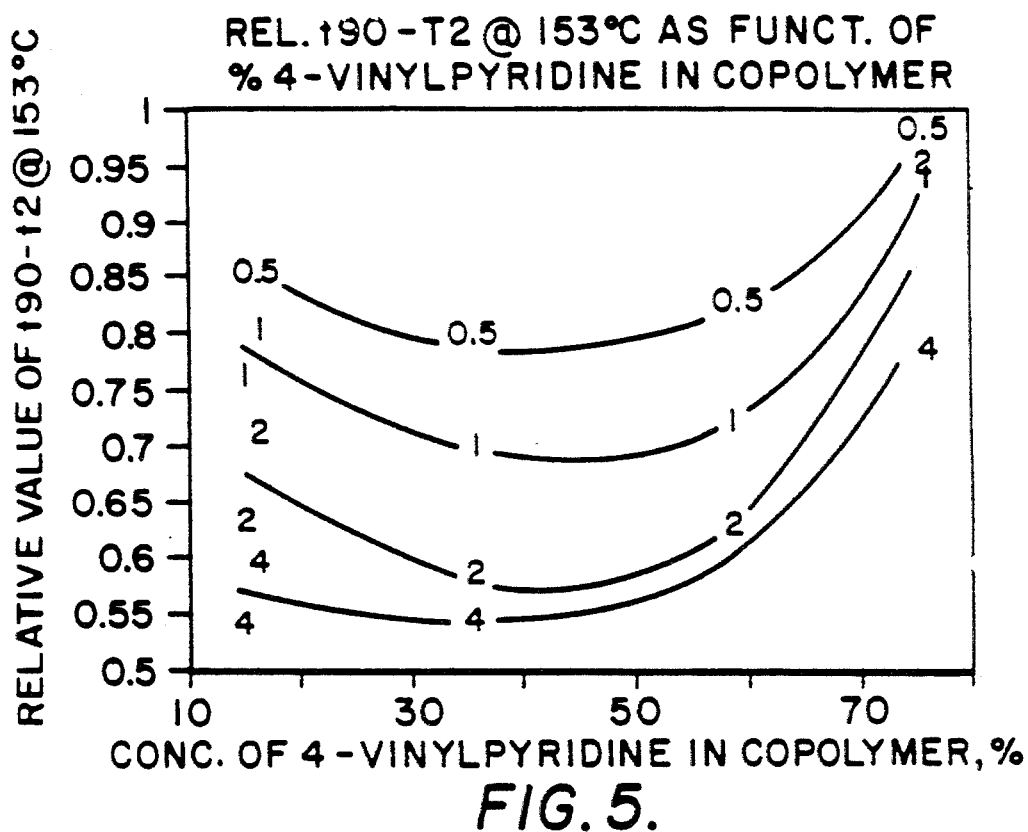
Figure 6:
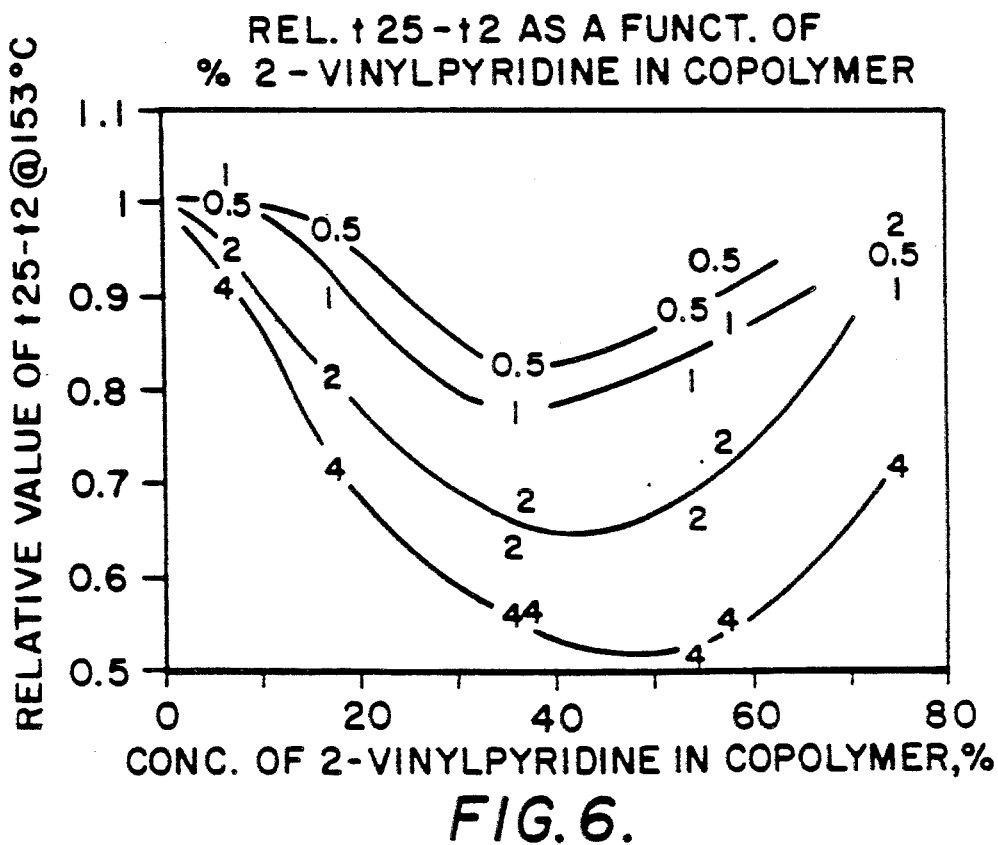
Figure 7:
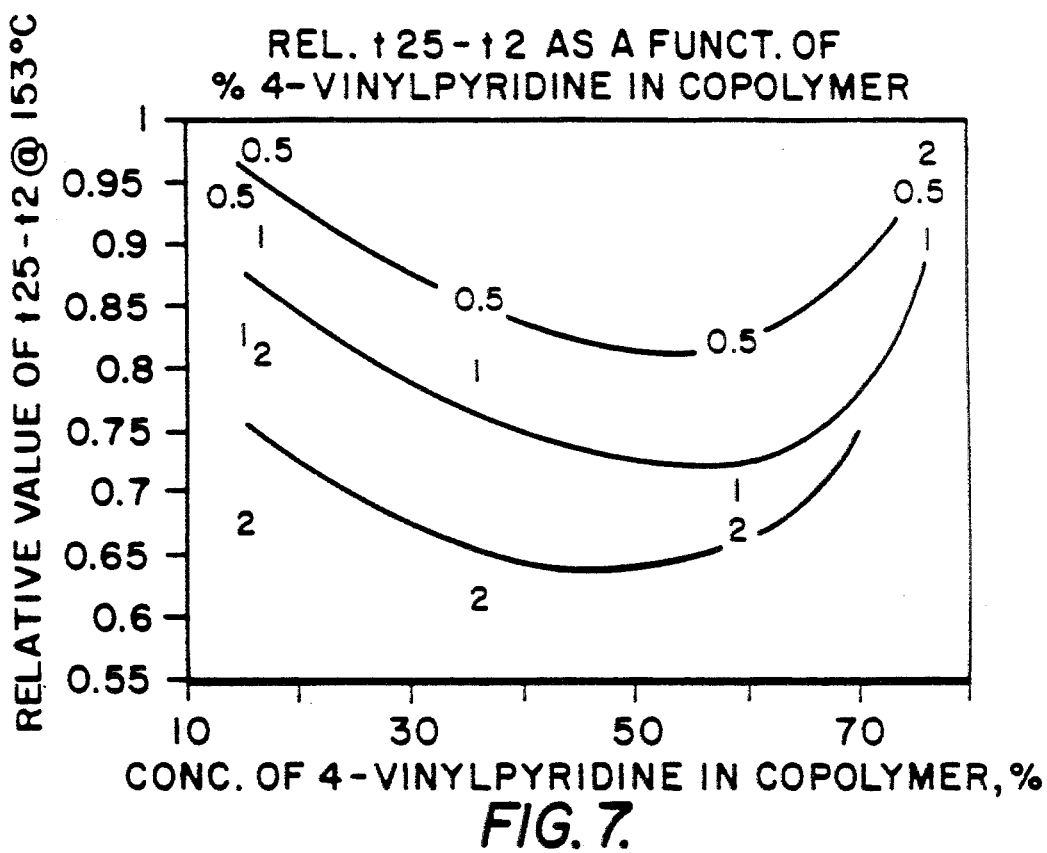
Figure 8:
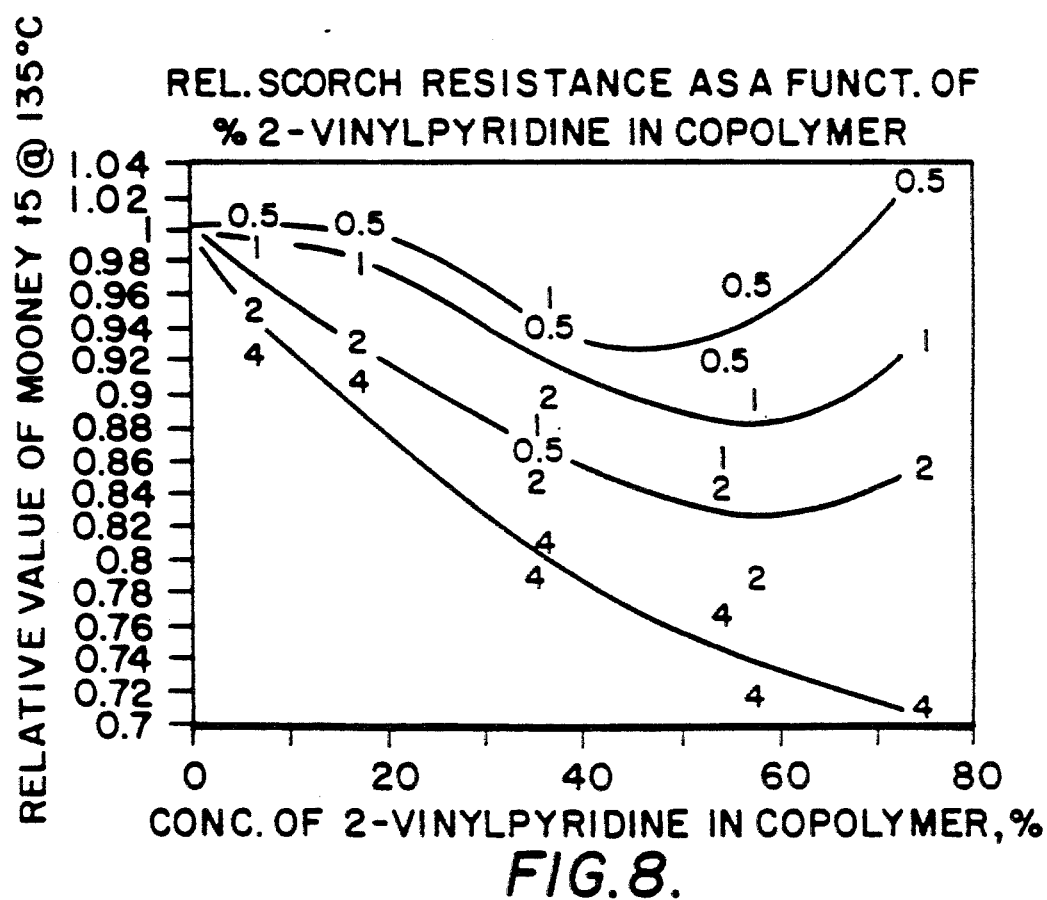
Figure 9:
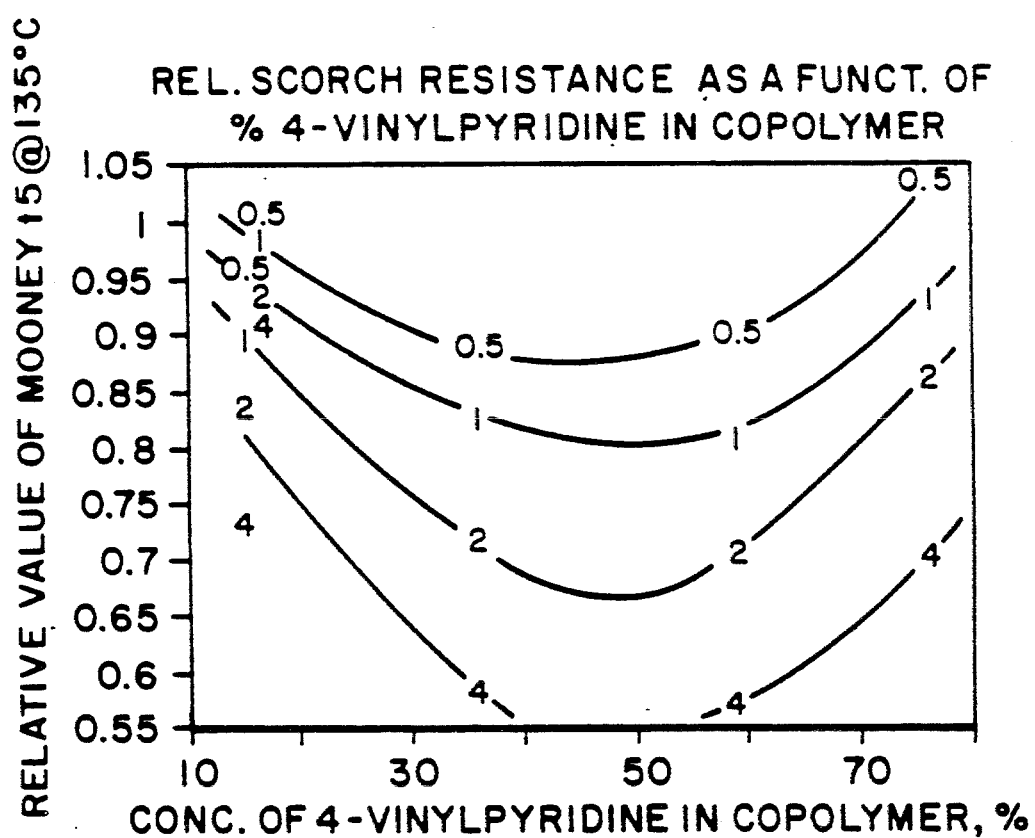

Test data are summarized in Tables II through XIII. "B-1 masterbatch" refers to the carbon black-filled SBR masterbatch containing all ingredients except the polymeric activators, sulfur, accelerator, anti-degradant, and the "extra" SBR 1500 (added to keep the amount of added "rubbery polymer" constant). For the most part, vulcanization characteristics were plotted as relative values in the contour plots of FIGS. 2–9. Relative values were determined by dividing the values obtained from the measurements of activator-containing stocks by the values obtained from the measurements of the corresponding control stock. In each case, the control stock, which contained no activator, was prepared from the same batch of masterbatch as was the experimental stock and was measured in the same set on the same day as was the experimental stock. The contours were obtained by interpolating between the experimental values. The numbers on or near the curves of FIGS. 2–9 locate the experimental points, and their values indicate the concentrations of the vinylpyridine-copolymer cure-system activators (0.5, 1.0, 2.0, and 4.0 phr).

It can be seen that the presence of 0.5–2.0 phr of a vinylpyridine-butadiene copolymer only slightly affects the mechanical properties of black-filled SBR vulcanizates. Even the effects of 4.0 phr of a vinylpyridine copolymer are not very large. The most significant effect on mechanical properties of the vulcanizates, though relatively slight, is the small increase in log decrement (decrease in rebound). The effect of the vinylpyridine copolymer activators on the vulcanization characteristics is of primary importance, and is brought out in the Figures.

TABLE II

|  | 2-VP1 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 30.6 | 30.7 | 30.4 | 29.0 | 28.4 |
| Oscil. Disc Rheometer data at. 153° | | | | | |
| Rmx, Nm | 3.95 | 3.97 | 3.99 | 4.00 | 4.04 |
| Rmn, Nm | 0.59 | 0.59 | 0.59 | 0.60 | 0.61 |
| t90 | 28.3 | 26.8 | 26.0 | 24.3 | 23.2 |
| t25 | 17.0 | 16.5 | 16.5 | 15.6 | 15.2 |
| t2 | 13.5 | 13.0 | 12.9 | 12.3 | 12.0 |
| t90 − t2 | 14.8 | 13.8 | 13.1 | 12.0 | 11.2 |
| t25 − t2 | 3.5 | 3.5 | 3.6 | 3.3 | 3.2 |
| k2, min. −1 | 0.177 | 0.202 | 0.219 | 0.245 | 0.268 |

TABLE II-continued

|  | 2-VP1 | | | | |
|---|---|---|---|---|---|
| t2/t25 | 0.794 | 0.787 | 0.781 | 0.788 | 0.789 |
| Stress-strain data, cured at 153° to Rmx (unaged) | | | | | |
| Shore A hardness | 66 | 66 | 65 | 65 | 67 |
| Stress at 300% strain, MPa | 13.1 | 13.6 | 14.2 | 14.0 | 15.0 |
| Ultimate tensile strength, MPa | 23.9 | 24.6 | 24.9 | 24.2 | 24.1 |
| Ultimate elongation, % | 471 | 482 | 466 | 459 | 434 |
| Goodrich Flexometer data 0.445 cm stroke, 1.21 MPa load | | | | | |
| Perm. set, % | 5.2 | 5.8 | 6.3 | 5.6 | 5.7 |
| Temperature rise, deg. C. | 30 | 29 | 27 | 26 | 31 |
| Lubke Rebound | | | | | |
| Initial, % | 70 | 69 | 69 | 69 | 70 |
| Log decrement | 0.141 | 0.147 | 0.152 | 0.147 | 0.145 |
| Tear Strength, Die C | | | | | |
| At room temp, lbf/in. | 275 | 269 | 271 | 255 | 253 |
| At 100°, lbf/in. | 125 | 128 | 139 | 109 | 116 |

TABLE III

|  | 2-VP1A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 28.5 | 28.5 | 28.0 | 26.5 | 26.0 |
| Oscil. Disc Rheometer data at. 153° | | | | | |
| Rmx, Nm | 3.90 | 3.95 | 3.93 | 3.95 | 3.95 |
| Rmn, Nm | 0.59 | 0.59 | 0.59 | 0.59 | 0.61 |
| t90 | 27.7 | 25.0 | 23.7 | 22.3 | 19.3 |
| t25 | 16.4 | 15.7 | 14.9 | 14.6 | 13.0 |
| t2 | 13.2 | 12.6 | 12.0 | 12.0 | 10.7 |
| t90 − t2 | 14.5 | 12.4 | 11.6 | 10.3 | 8.6 |
| t25 − t2 | 3.2 | 3.1 | 2.9 | 2.6 | 2.3 |
| k2, min. −1 | 0.181 | 0.231 | 0.252 | 0.287 | 0.347 |
| t2/t25 | 0.804 | 0.802 | 0.805 | 0.821 | 0.823 |
| Stress-strain data, cured at 153° to Rmx (unaged) | | | | | |
| Shore A hardness | 65 | 66 | 67 | 67 | 67 |
| Stress at 300% strain, MPa | 13.0 | 13.1 | 13.5 | 13.4 | 13.5 |
| Ultimate tensile strength, MPa | 23.2 | 24.0 | 23.7 | 20.8 | 21.7 |
| Ultimate elongation, % | 459 | 471 | 457 | 415 | 427 |
| Goodrich Flexometer data 0.445 cm stroke, 1.21 MPa load | | | | | |
| Perm. set, % | 6.1 | 6.4 | 6.3 | 6.7 | 7.1 |
| Temperature rise, deg. C. | 26 | 30 | 27 | 25 | 27 |
| Lubke Rebound | | | | | |
| Initial, % | 69 | 68 | 68 | 67 | 66 |
| Log decrement | 0.147 | 0.152 | 0.155 | 0.159 | 0.162 |
| Tear Strength, Die C | | | | | |
| At room temp, lbf/in. | 264 | 261 | 272 | 264 | 257 |
| At 100°, lbf/in. | 136 | 137 | 137 | 149 | 129 |

TABLE IV

|  | 2-VP2 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co- | — | 0.5 | 1.0 | 2.0 | 4.0 |

TABLE IV-continued

| | 2-VP2 | | | | |
|---|---|---|---|---|---|
| vinylpyridine) | | | | | |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 30.8 | 26.7 | 27.0 | 26.1 | 24.5 |
| Oscil. Disc Rheometer data at 153° | | | | | |
| Rmx, Nm | 3.94 | 3.93 | 3.94 | 3.94 | 3.85 |
| Rmn, Nm | 0.59 | 0.60 | 0.59 | 0.61 | 0.62 |
| t90 | 28.5 | 24.0 | 22.2 | 19.5 | 17.8 |
| t25 | 16.8 | 15.3 | 14.5 | 13.3 | 12.5 |
| t2 | 13.2 | 12.5 | 11.7 | 11.0 | 10.5 |
| t90 − t2 | 15.3 | 11.5 | 10.5 | 8.5 | 7.3 |
| t25 − t2 | 3.6 | 2.8 | 2.8 | 2.3 | 2.0 |
| k2, min.-1 | 0.173 | 0.252 | 0.287 | 0.320 | 0.416 |
| t2/t25 | 0.785 | 0.816 | 0.806 | 0.827 | 0.84 |
| Stress-strain data, cured at 153° to Rmx (unaged) | | | | | |
| Shore A hardness | 61 | 63 | 66 | 66 | 70 |
| Stress at 300% strain, MPa | 11.9 | 12.6 | 12.7 | 12.3 | 12.0 |
| Ultimate tensile strength, MPa | 23.9 | 23.4 | 23.9 | 21.8 | 22.5 |
| Ultimate elongation, % | 491 | 470 | 487 | 463 | 496 |
| Goodrich Flexometer data 0.445 cm stroke, 1.21 MPa load | | | | | |
| Perm. set, % | 5.9 | 7.2 | 7.7 | 9.5 | 13.1 |
| Temperature rise, deg. C. | 26 | 25 | 28 | 34 | 36 |
| Lubke Rebound | | | | | |
| Initial, % | 68 | 68 | 66 | 66 | 64 |
| Log decrement | 0.146 | 0.150 | 0.168 | 0.168 | 0.178 |
| Tear Strength, Die C | | | | | |
| At room temp, lbf/in. | 300 | 276 | 296 | 303 | 299 |
| At 100°, lbf/in. | 150 | 139 | 145 | 160 | 167 |

TABLE V

| | 2-VP2A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.9 | 28.2 | 28.5 | 26.8 | 24.1 |
| Oscil. Disc Rheometer data at 153° | | | | | |
| Rmx, Nm | 3.95 | 3.98 | 3.99 | 3.97 | 3.88 |
| Rmn, Nm | 0.59 | 0.59 | 0.59 | 0.60 | 0.62 |
| t90 | 27.3 | 24.2 | 22.3 | 20.0 | 17.3 |
| t25 | 16.4 | 15.7 | 14.9 | 13.8 | 12.4 |
| t2 | 13.0 | 12.9 | 12.1 | 11.5 | 10.5 |
| t90 − t2 | 14.3 | 11.3 | 10.2 | 8.5 | 6.8 |
| t25 − t2 | 3.4 | 2.8 | 2.8 | 2.3 | 1.9 |
| k2, min. −1 | 0.189 | 0.252 | 0.297 | 0.347 | 0.438 |
| t2/t25 | 0.792 | 0.821 | 0.812 | 0.833 | 0.846 |
| Stress-strain data, cured at 153° to Rmx (unaged) | | | | | |
| Shore A hardness | 66 | 67 | 68 | 71 | 73 |
| Stress at 300% strain, MPa | 13.4 | 13.7 | 14.2 | 14.0 | 14.0 |
| Ultimate tensile strength, MPa | 24.7 | 23.5 | 25.1 | 20.1 | 23.5 |
| Ultimate elongation, % | 467 | 448 | 470 | 392 | 459 |
| Goodrich Flexometer data 0.445 cm stroke, 1.21 MPa load | | | | | |
| Perm. set, % | 5.4 | 7.0 | 6.8 | 8.4 | 11.0 |

TABLE V-continued

| | 2-VP2A | | | | |
|---|---|---|---|---|---|
| Temperature rise, deg. C. | 26 | 29 | 27 | 30 | 36 |
| Lubke Rebound | | | | | |
| Initial, % | 69 | 69.5 | 69 | 67.5 | 65.5 |
| Log decrement | 0.144 | 0.144 | 0.147 | 0.159 | 0.162 |
| Tear Strength, Die C | | | | | |
| At room temp, lbf/in. | 291 | 256 | 275 | 285 | 276 |
| At 100°, lbf/in. | 123 | 121 | 130 | 132 | 136 |

TABLE VI

| | 2-VP3 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.1 | 28.1 | 26.1 | 22.9 | 21.0 |
| Oscil. Disc Rheometer data at 153° | | | | | |
| Rmx, Nm | 3.90 | 3.98 | 4.00 | 3.96 | 3.79 |
| Rmn, Nm | 0.60 | 0.60 | 0.60 | 0.61 | 0.61 |
| t90 | 26.3 | 24.0 | 21.5 | 18.9 | 16.1 |
| t25 | 15.3 | 14.7 | 13.9 | 12.5 | 11.2 |
| t2 | 12.2 | 11.8 | 11.2 | 10.2 | 9.5 |
| t90 − t2 | 14.1 | 12.2 | 10.3 | 8.7 | 6.6 |
| t25 − t2 | 3.1 | 2.9 | 2.7 | 2.3 | 1.7 |
| k2, min.-1 | 0.189 | 0.245 | 0.297 | 0.347 | 0.438 |
| t2/t25 | 0.797 | 0.802 | 0.805 | 0.816 | 0.848 |
| Stress-strain data, cured at 153° to Rmx (unaged) | | | | | |
| Shore A hardness | 60 | 65 | 65 | 67 | 70 |
| Stress at 300% strain, MPa | 12.0 | 12.4 | 12.4 | 12.0 | 11.4 |
| Ultimate tensile strength, MPa | 23.7 | 23.8 | 21.9 | 22.1 | 22.9 |
| Ultimate elongation, % | 497 | 489 | 549 | 478 | 525 |
| Goodrich Flexometer data 0.445 cm stroke, 1.21 MPa load | | | | | |
| Perm. set, % | 6.2 | 7.0 | 8.6 | 9.5 | 16.3 |
| Temperature rise, deg. C. | 25 | 25 | 32 | 31 | 44 |
| Lubke Rebound | | | | | |
| Initial, % | 68 | 68 | 66 | 66 | 64 |
| Log decrement | 0.170 | 0.150 | 0.168 | 0.168 | 0.178 |
| Tear Strength, Die C | | | | | |
| At room temp, lbf/in. | 274 | 276 | 296 | 303 | 299 |
| At 100°, lbf/in. | 149 | 139 | 144 | 160 | 167 |

TABLE VII

| | 2-VP3A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.8 | 27.5 | 25.5 | 25.1 | 22.8 |
| Oscil. Disc Rheometer data at 153° | | | | | |
| Rmx, Nm | 3.92 | 4.02 | 4.04 | 3.99 | 3.82 |
| Rmn, Nm | 0.61 | 0.61 | 0.62 | 0.60 | 0.62 |
| t90 | 27.1 | 23.5 | 21.4 | 18.8 | 16.3 |
| t25 | 15.9 | 14.7 | 13.8 | 12.6 | 11.4 |
| t2 | 12.6 | 11.8 | 11.1 | 10.4 | 9.7 |

TABLE VII-continued

| | 2-VP3A | | | | |
|---|---|---|---|---|---|
| $t_{90} - t_2$ | 14.5 | 11.7 | 10.3 | 8.4 | 6.6 |
| $t_{25} - t_2$ | 3.3 | 2.9 | 2.7 | 2.2 | 1.7 |
| $k_2$, min.$^{-1}$ | 0.185 | 0.252 | 0.297 | 0.320 | 0.462 |
| $t_2/t_{25}$ | 0.792 | 0.802 | 0.804 | 0.825 | 0.850 |
| Stress-strain data, cured at 153° to Rmx (unaged) | | | | | |
| Shore A hardness | 65 | 68 | 67 | 66 | 70 |
| Stress at 300% strain, MPa | 12.6 | 12.6 | 12.3 | 12.2 | 11.6 |
| Ultimate tensile strength, MPa | 21.9 | 20.9 | 19.7 | 21.8 | 21.2 |
| Ultimate elongation, % | 455 | 432 | 418 | 464 | 483 |
| Goodrich Flexometer data 0.445 cm stroke, 1.21 MPa load | | | | | |
| Perm. set, % | 6.7 | 6.6 | 8.6 | 10.0 | 15.5 |
| Temperature rise, deg. C. | 28 | 28 | 32 | 31 | 44 |
| Lubke Rebound | | | | | |
| Initial, % | 66 | 66 | 66 | 64 | 68 |
| Log decrement | 0.181 | 0.162 | 0.173 | 0.166 | 0.170 |
| Tear Strength, Die C | | | | | |
| At room temp, lbf/in. | 282 | 291 | 280 | 305 | 274 |
| At 100°, lbf/in. | 142 | 138 | 145 | 160 | 149 |

TABLE VIII

| | 2-VP4A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| $t_5$, min. | 28.5 | 29.5 | 26.5 | 24.4 | 20.0 |
| Oscil. Disc Rheometer data at 153° | | | | | |
| Rmx, Nm | 3.92 | 3.92 | 3.94 | 3.91 | 3.94 |
| Rmn, Nm | 0.62 | 0.63 | 0.63 | 0.63 | 0.65 |
| $t_{90}$ | 26.5 | 25.9 | 25.0 | 24.5 | 20.5 |
| $t_{25}$ | 15.4 | 15.0 | 14.4 | 14.0 | 11.6 |
| $t_2$ | 12.2 | 12.0 | 11.5 | 10.9 | 9.3 |
| $t_{90} - t_2$ | 14.3 | 13.9 | 13.5 | 13.6 | 11.2 |
| $t_{25} - t_2$ | 3.2 | 3.0 | 2.9 | 3.1 | 2.3 |
| $k_2$, min.$^{-1}$ | 0.185 | 0.189 | 0.198 | 0.208 | 0.245 |
| $t_2/t_{25}$ | 0.792 | 0.8 | 0.798 | 0.778 | 0.801 |
| Stress-strain data, cured at 153° to Rmx (unaged) | | | | | |
| Shore A hardness | 65 | 65 | 67 | 70 | 72 |
| Stress at 300% strain, MPa | 12.6 | 12.9 | 12.9 | 12.2 | 12.9 |
| Ultimate tensile strength, MPa | 22.3 | 21.5 | 20.9 | 19.4 | 17.2 |
| Ultimate elongation, % | 459 | 439 | 443 | 419 | 373 |
| Goodrich Flexometer data 0.445 cm stroke, 1.21 MPa load | | | | | |
| Perm. set, % | 7.3 | 7.1 | 6.6 | 8.6 | 11.0 |
| Temperature rise, deg. C. | 26 | 29 | 44 | 31 | 38 |
| Lubke Rebound | | | | | |
| Initial, % | 67 | 69 | 68 | 68 | 67 |
| Log decrement | 0.152 | 0.151 | 0.151 | 0.151 | 0.154 |
| Tear Strength, Die C | | | | | |
| At room temp, lbf/in. | 301 | 282 | 275 | 291 | 288 |
| At 100°, lbf/in. | 139 | 137 | 146 | 140 | 159 |

TABLE IX

| | 4-VP1 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| $t_5$, min. | 29.5 | 28.0 | 26.5 | 24.5 | 21.6 |
| Oscil. Disc Rheometer data at 153° | | | | | |
| Rmx, Nm | 3.96 | 4.01 | 4.06 | 4.10 | 4.15 |
| Rmn, Nm | 0.56 | 0.58 | 0.60 | 0.65 | 0.69 |
| $t_{90}$ | 27.8 | 25.0 | 23.3 | 20.3 | 17.7 |
| $t_{25}$ | 16.2 | 15.4 | 14.6 | 13.1 | 11.5 |
| $t_2$ | 12.8 | 12.2 | 11.8 | 10.8 | 9.5 |
| $t_{90} - t_2$ | 15.0 | 12.8 | 11.5 | 9.5 | 8.2 |
| $t_{25} - t_2$ | 3.4 | 3.2 | 2.8 | 2.3 | 2.0 |
| $k_2$, min.$^{-1}$ | 0.177 | 0.213 | 0.245 | 0.287 | 0.347 |
| $t_2/t_{25}$ | 0.790 | 0.792 | 0.808 | 0.824 | 0.826 |
| Stress-strain data, cured at 153° to Rmx (unaged) | | | | | |
| Shore A hardness | 66 | 66 | 68 | 70 | 75 |
| Stress at 300% strain, MPa | 13.5 | 13.7 | 14.1 | 13.7 | 14.2 |
| Ultimate tensile strength, MPa | 26.3 | 24.4 | 23.2 | 22.8 | 22.3 |
| Ultimate elongation, % | 505 | 466 | 443 | 442 | 422 |
| Goodrich Flexometer data 0.445 cm stroke, 1.21 MPa load | | | | | |
| Perm. set, % | 5.4 | 5.6 | 6.4 | 5.9 | 6.8 |
| Temperature rise, deg. C. | 24 | 28 | 27 | 28 | 29 |
| Lubke Rebound | | | | | |
| Initial, % | 67 | 68 | 67 | 67 | 65 |
| Log decrement | 0.150 | 0.139 | 0.154 | 0.154 | 0.167 |
| Tear Strength, Die C | | | | | |
| At room temp, lbf/in. | 270 | 297 | 272 | 266 | 268 |
| At 100°, lbf/in. | 166 | 147 | 148 | 140 | 139 |

TABLE X

| | 4-VP1A | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| $t_5$, min. | 28.5 | 28.5 | 28.0 | 26.5 | 26.0 |
| Oscil. Disc Rheometer data at 153° | | | | | |
| Rmx, Nm | 3.90 | 3.95 | 3.93 | 3.95 | 3.95 |
| Rmn, Nm | 0.59 | 0.59 | 0.59 | 0.59 | 0.61 |
| $t_{90}$ | 27.7 | 25.0 | 23.7 | 22.3 | 19.3 |
| $t_{25}$ | 16.4 | 15.7 | 15.0 | 14.6 | 13.0 |
| $t_2$ | 13.2 | 12.6 | 12.1 | 12.0 | 10.7 |
| $t_{90} - t_2$ | 14.5 | 12.4 | 11.6 | 10.3 | 8.6 |
| $t_{25} - t_2$ | 3.2 | 3.1 | 2.9 | 2.6 | 2.3 |
| $k_2$, min.$^{-1}$ | 0.181 | 0.231 | 0.252 | 0.287 | 0.347 |
| $t_2/t_{25}$ | 0.804 | 0.802 | 0.806 | 0.821 | 0.823 |
| Stress-strain data, cured at 153° to Rmx (unaged) | | | | | |
| Shore A hardness | 65 | 66 | 67 | 67 | 67 |
| Stress at 300% strain, MPa | 13.0 | 13.1 | 13.5 | 13.4 | 13.5 |
| Ultimate tensile strength, MPa | 23.2 | 24.0 | 23.7 | 20.8 | 21.7 |
| Ultimate elongation, % | 459 | 471 | 457 | 415 | 427 |
| Goodrich Flexometer data | | | | | |

TABLE X-continued

| | 4-VP1A | | | | |
|---|---|---|---|---|---|
| 0.445 cm stroke, 1.21 MPa load | | | | | |
| Perm. set, % | 6.1 | 6.4 | 6.3 | 6.7 | 7.1 |
| Temperature rise, deg. C. | 26 | 30 | 27 | 25 | 27 |
| Lubke Rebound | | | | | |
| Initial, % | 69 | 68 | 68 | 67 | 66 |
| Log decrement | 0.147 | 0.152 | 0.155 | 0.159 | 0.162 |
| Tear Strength, Die C | | | | | |
| At room temp, lbf/in. | 264 | 261 | 273 | 264 | 257 |
| At 100°, lbf/in. | 136 | 137 | 137 | 149 | 129 |

TABLE XI

| | 4-VP2 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.5 | 26.0 | 24.4 | 21.0 | 17.2 |
| Oscil. Disc Rheometer data at 153° | | | | | |
| Rmx, Nm | 3.96 | 4.13 | 4.15 | 4.25 | 4.25 |
| Rmn, Nm | 0.56 | 0.62 | 0.61 | 0.64 | 0.70 |
| t90 | 27.8 | 23.2 | 21.3 | 18.2 | 16.2 |
| t25 | 16.2 | 14.2 | 13.5 | 11.6 | 10.2 |
| t2 | 12.8 | 11.3 | 10.8 | 9.5 | 8.0 |
| t90 − t2 | 15.0 | 11.9 | 10.5 | 8.7 | 8.2 |
| t25 − t2 | 3.4 | 2.9 | 2.7 | 2.1 | 2.2 |
| k2, min. −1 | 0.177 | 0.238 | 0.268 | 0.333 | 0.362 |
| t2/t25 | 0.790 | 0.795 | 0.8 | 0.818 | 0.784 |
| Stress-strain data, cured at 153° to Rmx (unaged) | | | | | |
| Shore A hardness | 66 | 69 | 70 | 73 | 78 |
| Stress at 300% strain, MPa | 13.5 | 15.0 | 15.1 | 15.3 | 15.9 |
| Ultimate tensile strength, MPa | 26.3 | 24.4 | 24.8 | 23.5 | 22.5 |
| Ultimate elongation, % | 505 | 441 | 441 | 423 | 405 |
| Goodrich Flexometer data 0.445 cm stroke, 1.21 MPa load | | | | | |
| Perm. set, % | 5.4 | 5.7 | 6.3 | 7.7 | 10.2 |
| Temperature rise, deg. C. | 24 | 26 | 27 | 28 | 35 |
| Lubke Rebound | | | | | |
| Initial, % | 67 | 69 | 67 | 66 | 66 |
| Log decrement | 0.150 | 0.140 | 0.154 | 0.153 | 0.162 |
| Tear Strength, Die C | | | | | |
| At room temp, lbf/in. | 270 | 293 | 290 | 292 | 304 |
| At 100°, lbf/in. | 166 | 151 | 154 | 140 | 156 |

TABLE XII

| | 4-VP3 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 29.0 | 26.0 | 23.5 | 20.4 | 16.5 |
| Oscil. Disc Rheometer data at 153° | | | | | |
| Rmx, Nm | 3.92 | 4.05 | 4.11 | 4.22 | 4.15 |
| Rmn, Nm | 0.59 | 0.60 | 0.52 | 0.63 | 0.65 |

TABLE XII-continued

| | 4-VP3 | | | | |
|---|---|---|---|---|---|
| t90 | 26.5 | 22.8 | 20.3 | 17.7 | 16.2 |
| t25 | 15.8 | 14.0 | 12.5 | 11.2 | 10.1 |
| t2 | 12.5 | 11.3 | 10.2 | 9.0 | 7.5 |
| t90 − t2 | 14.0 | 11.5 | 10.1 | 8.7 | 8.7 |
| t25 − t2 | 3.3 | 2.7 | 2.3 | 2.2 | 2.6 |
| k2, min. −1 | 0.185 | 0.238 | 0.268 | 0.333 | 0.378 |
| t2/t25 | 0.791 | 0.807 | 0.816 | 0.803 | 0.742 |
| Stress-strain data, cured at 153° to Rmx (unaged) | | | | | |
| Shore A hardness | 67 | 68 | 69 | 73 | 78 |
| Stress at 300% strain, MPa | 13.4 | 14.2 | 14.7 | 15.2 | 15.3 |
| Ultimate tensile strength, MPa | 25.9 | 25.6 | 24.7 | 23.7 | 23.5 |
| Ultimate elongation, % | 502 | 476 | 446 | 439 | 436 |
| Goodrich Flexometer data 0.445 cm stroke, 1.21 MPa load | | | | | |
| Perm. set, % | 5.3 | 7.4 | 8.0 | 9.3 | 14.5 |
| Temperature rise, deg. C. | 30 | 29 | 27 | 36 | 40 |
| Lubke Rebound | | | | | |
| Initial, % | 68 | 68 | 67 | 67 | 64 |
| Log decrement | 0.151 | 0.146 | 0.150 | 0.145 | 0.160 |
| Tear Strength, Die C | | | | | |
| At room temp, lbf/in. | 295 | 278 | 284 | 303 | 309 |
| At 100°, lbf/in. | 149 | 149 | 128 | 151 | 170 |

TABLE XIII

| | 4-VP4 | | | | |
|---|---|---|---|---|---|
| B-1 Masterbatch | 162 | 162 | 162 | 162 | 162 |
| SBR 1502 | 4.0 | 3.5 | 3.0 | 2.0 | — |
| Poly(butadiene-co-vinylpyridine) | — | 0.5 | 1.0 | 2.0 | 4.0 |
| Santoflex 13 antidegradant | 2.0 | 2.0 | 2.0 | 2.0 | 2.0 |
| Santocure NS accelerator | 1.2 | 1.2 | 1.2 | 1.2 | 1.2 |
| Sulfur | 2.0 | 2.0 | 2.0 | 2.0 | 2.0 |
| Mooney scorch 135° | | | | | |
| t5, min. | 28.5 | 29.5 | 26.5 | 24.4 | 20.0 |
| Oscil. Disc Rheometer data at 153° | | | | | |
| Rmx, Nm | 3.92 | 3.92 | 3.94 | 3.91 | 3.94 |
| Rmn, Nm | 0.62 | 0.63 | 0.63 | 0.63 | 0.65 |
| t90 | 26.5 | 25.9 | 25.0 | 24.5 | 20.5 |
| t25 | 15.4 | 15.0 | 14.4 | 14.0 | 11.6 |
| t2 | 12.2 | 12.0 | 11.5 | 10.9 | 9.3 |
| t90 − t2 | 14.3 | 13.9 | 13.5 | 13.6 | 11.2 |
| t25 − t2 | 3.2 | 3.0 | 2.9 | 3.1 | 2.3 |
| k2, min.−1 | 0.185 | 0.189 | 0.198 | 0.208 | 0.245 |
| t2/t25 | 0.792 | 0.8 | 0.798 | 0.778 | 0.801 |
| Stress-strain data, cured at 153° to Rmx (unaged) | | | | | |
| Shore A hardness | 65 | 65 | 67 | 70 | 72 |
| Stress at 300% strain, MPa | 12.6 | 12.9 | 12.9 | 12.2 | 12.9 |
| Ultimate tensile strength, MPa | 22.3 | 21.5 | 20.9 | 19.4 | 17.2 |
| Ultimate elongation, % | 459 | 439 | 443 | 419 | 373 |
| Goodrich Flexometer data 0.445 cm stroke, 1.21 MPa load | | | | | |
| Perm. set, % | 7.3 | 7.1 | 6.6 | 8.6 | 11.0 |
| Temperature rise, deg. C. | 26 | 29 | 44 | 31 | 38 |
| Lubke Rebound | | | | | |
| Initial, % | 67 | 69 | 68 | 68 | 67 |
| Log decrement | 0.152 | 0.151 | 0.151 | 0.151 | 0.154 |
| Tear Strength, Die C | | | | | |
| At room temp, lbf/in. | 301 | 282 | 275 | 291 | 288 |
| At 100°, lbf/in. | 138 | 137 | 146 | 140 | 159 |

The contours of FIGS. 2-7 indicate that the vinylpyridine copolymers are effective as cure-rate activators when the vinylpyridine content of the copolymer is between 20 and 65%, and are most effective when it is between 35 and 50%. The parameter K2 indicates the relative rate of vulcanization throughout most of the process after the crosslinking reaction is under way. The parameter T90-t2 is an inverse indication of the overall crosslinking reaction.

The parameter T25-t2 is an inverse indication of the rate of crosslink formation early in the crosslinking process. It is important since rubber products are frequently removed from the mold before the crosslinking process is complete. Removing an article from the mold as soon as practical (lest there be bubbles, porosity, etc.), prevents tearing of an article during its demolding and it saves expensive molding time. Thus, much of the vulcanization occurs while the article is still hot but removed from the mold.

As the vinylpyridine content of the copolymer increases, the cure-activation effect of the pyridyl moiety would be expected to continuously increase since there would be more and more of it. However, after a vinylpyridine content of greater than 50% is reached, there is a reduced effect on vulcanization rate. This could be due to an increase in thermodynamic incompatibility between the vinylpyridine copolymer and SBR. Regardless of the reason, substantial increases in cure rates can be obtained when the vinylpyridine content of the activator is between 20 and 65%, with the greatest effects being obtained when the vinylpyridine content is between 35 and 50%.

The cure-rate activating effects of the copolymers prepared from 2-vinylpyridine are generally somewhat greater than those from 4-vinylpyridine; however, the copolymers prepared from 4-vinylpyridine appear to be somewhat more scorch activating, especially when the higher levels of the activators are used. The effects on scorch resistance can be observed in FIGS. 8 and 9.

The effects of the additives on cure rate are greater at higher levels of loading or usage. Substantial effects are obtained at all levels of loading shown in the data. However, the higher levels might be less appropriate for some applications since it is indicated by the rebound testing that higher levels of loading might give somewhat hysteretic stocks. In such cases, maximum levels of usage of the additives might be limited to 1-2 or 3 phr.

The final state of cure, as indicated by Rmx, is almost insensitive to the concentration of the polymeric activator. Provided that 1.0 or less of the activator is used, scorch resistance is reduced by only about 3-4%, whereas the rate of crosslink formation during vulcanization can be increased by about 60%. At an activator level of 2.0 phr, the scorch resistance is still only reduced by about 10% but the crosslink formation can be increased by over 80%. Even at an activator usage level of 4.0 phr, scorch resistance is reduced by less than 20%, but the rate of crosslink formation can be increased by about 130%. The inverse cure-rate index t90-t2 is correspondingly reduced by 29%, 41% or 52% when 1.0 phr, 2.0 phr, or 4.0 phr of the activator is used.

The results are similar, though not as dramatic for the inverse early cure-rate index t25-t2.

EXAMPLE III

In order to demonstrate the behavior of composite rubber constructions in which a natural rubber compound was vulcanized in contact with an SBR rubber compound, a series of stocks are prepared.

Firstly, a natural rubber masterbatch ("A-1 Masterbatch") is prepared according to the following recipe: SMR-CV natural rubber, 100; N-330 carbon black (HAF), 50; Circosol 4240 naphthenic oil, 5; zinc oxide, 5; stearic acid, 2.

Then, by using the copolymer 2VP-3A (containing 53.8% vinylpyridine), a series of stocks are prepared, based on the SBR masterbatch ("B-1 Masterbatch") in the same way as in Example II.

Curatives are again added on the roll mill as in Example II. Test data are summarized in Table XIV.

TABLE XIV

| STOCK | 1 | 2 | 3 | 4 | 5 | 6 |
|---|---|---|---|---|---|---|
| A-1 Masterbatch | — | — | — | — | — | 162 |
| B-1 Masterbatch | 162 | 162 | 162 | 162 | 162 | — |
| SBR-1502 | 4.0 | — | 2.0 | 3.0 | 3.5 | — |
| 2VP-3A Activator | — | 4.0 | 2.0 | 1.0 | 0.5 | — |
| SANTOFLEX ® 13 | 2.0 | 2.0 | 2.0 | 2.0 | 2.0 | 2.0 |
| SANTOCURE ® NS | 1.2 | 1.2 | 1.2 | 1.2 | 1.2 | 0.6 |
| Sulfur | 2.0 | 2.0 | 2.0 | 2.0 | 2.0 | 2.0 |
| Rheometer Data at 153° | | | | | | |
| R max, Nm | 3.89 | 3.78 | 3.96 | 3.99 | 3.99 | 3.36 |
| R min, Nm | 0.64 | 0.65 | 0.64 | 0.64 | 0.64 | 0.58 |
| Max. Vulcanization Velocity, %/min. | 11.9 | 22.6 | 18.8 | 15.6 | 14.2 | 24.9 |
| t2, min. | 10.8 | 9.0 | 9.5 | 10.0 | 10.7 | 5.5 |
| t90 − t2, min. | 12.8 | 6.7 | 8.2 | 9.3 | 10.7 | 6.5 |
| t25 − t2, min. | 2.5 | 1.2 | 1.9 | 2.2 | 2.3 | 0.9 |
| K2, min.-1 | 0.198 | 0.369 | 0.347 | 0.297 | 0.260 | 0.362 |

The Rheometer data show that the natural rubber (stock 6) is much faster curing than the SBR control (stock 1); however, at the 4 phr level of activator (stock 2), the cure rate is comparable to that of the natural rubber stock.

Composite test samples were made by filling one half of a tensile-test sheet mold with one stock and the other half with another stock. The composite samples were cured for various times, and stress-strain properties were measured across the weld line, in a direction perpendicular to the weld line of each composite structure.

Test samples were made, combining the stocks as follows:
1/6 - SBR control/natural stock
2/6 - SBR +4 phr activator/natural
3/6 - SBR +2 phr activator/natural
4/6 - SBR +1 phr activator/natural
5/6 - SBR +0.5 phr activator/natural
6/6 - natural/natural
1/1 - SBR control/SBR control
2/2 - SBR +4 phr activator/SBR +4 phr activator.

In TABLE XV the stress-strain properties of the composite samples are shown at 10, 12.5 and 15 minutes cure time at 153°.

TABLE XV

| | 1/6 | 2/6 | 3/6 | 4/6 | 5/6 | 6/6 | 1/1 | 2/2 |
|---|---|---|---|---|---|---|---|---|
| CURE TIME = 10 MIN. COMPOSITE SAMPLE | | | | | | | | |
| Stress at 100% strain, MPa | 0.8 | 1.8 | 1.3 | 1.0 | 0.7 | 2.3 | 0.5 | 1.7 |
| Stress at 300% strain, MPa | 1.2 | 6.5 | 4.0 | 2.9 | 1.3 | 11.5 | 0.7 | 5.4 |

TABLE XV-continued

|  | 1/6 | 2/6 | 3/6 | 4/6 | 5/6 | 6/6 | 1/1 | 2/2 |
|---|---|---|---|---|---|---|---|---|
| UTS, MPa | 1.2 | 18.7 | 10.7 | 4.2 | 1.7 | 25.9 | 1.0 | 19.2 |
| UE, % | 460 | 673 | 663 | 654 | 490 | 561 | 1070 | 770 |
| CURE TIME = 12.5 MIN COMPOSITE SAMPLE | | | | | | | | |
| Stress at 100% strain, MPa | 1.7 | 2.4 | 2.2 | 1.8 | 1.4 | 2.3 | 1.1 | 2.6 |
| Stress at 300% strain, MPa | 8.1 | 10.3 | 10.2 | 7.9 | 5.4 | 11.5 | 3.9 | 10.5 |
| UTS, MPa | 17.4 | 22.4 | 21.4 | 21.4 | 17.1 | 23.3 | 18.0 | 24.4 |
| UE, % | 523 | 521 | 582 | 619 | 652 | 498 | 850 | 585 |
| CURE TIME = 15 MIN COMPOSITE SAMPLE | | | | | | | | |
| Stress at 100% strain, MPa | 1.7 | 2.5 | 2.4 | 2.2 | 1.9 | 2.1 | 1.4 | 2.7 |
| Stress at 300% strain, MPa | 8.1 | 10.9 | 10.7 | 10.3 | 9.2 | 10.3 | 6.6 | 10.3 |
| UTS, MPa | 20.3 | 24.5 | 23.6 | 24.5 | 22.5 | 25.2 | 22.7 | 22.1 |
| UE, % | 561 | 562 | 544 | 569 | 572 | 552 | 704 | 541 |

The stress-strain data in Table XV shown that after 10 min. cure at 153°, the SBR/natural composite without activator (1/6) is very weak, while the composites with increasing amounts of activator in the SBR portion show corresponding increases in strength.

The composite 1/6, which contains both the fast-curing natural rubber and the slow-curing SBR (with no activator), develops less strength in fifteen minutes than does composite 1/1, which contains only the slow-curing SBR (again, with no activator). This is an indication that curative may be emigrating from the SBR to the natural in the 1/6 composite. However, in composite 2/6, wherein the SBR portion contains 4 phr activator, strength is developed almost as fast as in composite 2/2 which contains only SBR with 4 phr activator, indicating far less apparent emigration of curative in the 2/6 composite.

We claim:

1. A rubber composition comprising butadiene polymer rubber, sulfur and a vulcanization accelerator, and from 0.5 to 2.0 parts by weight, per 100 parts by weight of the rubber of a cure activator, which activator is an interpolymer of a vinylpyridine monomer and a diene hydrocarbon co-monomer in which the interpolymer contains from 30% to 55% by weight of vinylpyridine units.

2. The composition of claim 1 wherein sulfur is present in an amount of from 0.2 to 4 parts by weight and the accelerator is present in an amount of from 0.2 to 5 parts by weight per 100 parts butadiene polymer rubber.

3. The composition of claim 2 wherein the butadiene polymer rubber is a copolymer from a minor amount of styrene and a major amount of butadiene.

4. The composition of claim 2 wherein the vinylpyridine monomer is selected from 2-vinylpyridine, 4-vinylpyridine and 2-methyl-5-vinylpyridine and the diene hydrocarbon co-monomer is 1,3-butadiene.

5. The composition of claim 4 wherein the butadiene polymer rubber is a copolymer from a minor amount of styrene and a major amount of butadiene.

6. The composition of claim 5 wherein the vinylpyridine monomer is 2-vinylpyridine.

7. The composition of claim 6 wherein the activator contains from 35% to 50% by weight of 2-vinylpyridine.

8. The composition of claim 4 wherein the butadiene polymer is a homopolymer of 1,3-butadiene.

9. The composition of claim 7 wherein the vinylpyridine monomer is 2-vinylpyridine.

10. The composition of claim 9 wherein the activator contains from 35% to 50% by weight of vinylpyridine units.

* * * * *